(12) United States Patent
Raley et al.

(10) Patent No.: US 12,328,582 B2
(45) Date of Patent: Jun. 10, 2025

(54) WIRELESS AUDIO DISTRIBUTION SYSTEMS AND METHODS

(71) Applicant: PRA Audio Systems, Inc., Lawrenceville, GA (US)

(72) Inventors: Kenneth Paul Raley, Lawrenceville, GA (US); Robert Mark Krikorian, Decatur, GA (US)

(73) Assignee: PRA Audio Systems, Inc., Lawrenceville, GA (US)

( * ) Notice: Subject to any disclaimer, the term of this patent is extended or adjusted under 35 U.S.C. 154(b) by 431 days.

(21) Appl. No.: 18/063,821

(22) Filed: Dec. 9, 2022

(65) Prior Publication Data

US 2023/0199504 A1 Jun. 22, 2023

Related U.S. Application Data

(60) Provisional application No. 63/292,530, filed on Dec. 22, 2021.

(51) Int. Cl.
*H04H 20/95* (2008.01)
*H04H 20/71* (2008.01)
*H04W 12/08* (2021.01)
*H04W 12/55* (2021.01)

(52) U.S. Cl.
CPC ............ *H04W 12/55* (2021.01); *H04H 20/71* (2013.01); *H04H 20/95* (2013.01); *H04W 12/08* (2013.01)

(58) Field of Classification Search
CPC ....... H04H 20/71; H04H 20/95; H04W 12/08; H04W 12/50; H04W 12/55
See application file for complete search history.

(56) References Cited

U.S. PATENT DOCUMENTS

| 7,218,645 | B2 * | 5/2007 | Lotter ................ H04L 41/0823 370/467 |
| 9,699,559 | B2 | 7/2017 | Hammer et al. |
| 9,788,117 | B2 | 10/2017 | Watson et al. |
| 10,014,001 | B2 | 7/2018 | Elliot et al. |
| 10,454,604 | B2 | 10/2019 | Elliot et al. |
| 10,938,711 | B2 | 3/2021 | Sharma et al. |
| 2003/0063598 | A1 * | 4/2003 | Huo ...................... H04L 69/324 370/349 |

\* cited by examiner

*Primary Examiner* — Brian F Shaw
(74) *Attorney, Agent, or Firm* — TROUTMAN PEPPER LOCKE LLP; Christopher C. Close, Jr.; Mark Lehi Jones

(57) ABSTRACT

Wireless audio distribution technology for improved performance can include receiving, at a configurable software-defined hub, a pairing initiation signal to connect the hub with at least one node of one or more configurable software-defined nodes. The method can include receiving, from the at least one node, a plurality of node identifiers; authorizing the at least one node based on a comparison of the plurality of node identifiers and identifier data stored in the hub memory; securely pairing the configurable software-defined hub with at least one authorized node; configuring a software-defined transceiver chain comprising a configurable hub transmitter and an authorized node receiver with a modified Logical Link Control layer and an unmodified Media Access Control layer of an Open System Interconnect protocol, and communicating data in a predetermined format from the configurable hub transmitter to the authorized node receiver.

20 Claims, 11 Drawing Sheets

WIRELESS AUDIO DISTRIBUTION SYSTEMS AND METHODS

CROSS-REFERENCE TO RELATED APPLICATIONS

This application claims priority to U.S. Provisional Patent Application Ser. No. 63/292,530, filed on 22 Dec. 2021, entitled "WIRELESS AUDIO DISTRIBUTION SYSTEMS AND METHODS," the contents of which are hereby incorporated by reference in their entirety as if presented herein in full.

FIELD

The disclosed technology generally relates to wireless audio, and in particular, to systems and methods for wireless audio distribution for improved performance.

BACKGROUND

In audio applications, a common requirement is to send audio from one source to multiple destinations. A typical example is to send one audio source to many speakers in a home or business as depicted in FIG. 1. Such one source to multiple destinations may also be used in surround-sound environments.

In other audio applications, it may be required to transmit from multiple audio sources to one audio receiver as depicted in FIG. 2. Typical use cases for this scenario can include musical groups or multiple speaker panels where several microphones are used by different people to send corresponding signals to a central mixing board or a single speaker for audio reproduction.

In yet other audio applications, it may be required to transmit from multiple audio sources to multiple audio receivers as depicted in FIG. 3. Certain example use cases of this scenario can include airport terminals or banquet rooms where signals from several microphones used by different people are sent to different selected (or all) corresponding receivers or speakers for audio reproduction.

In each of these applications and scenarios, sending and receiving audio over a wireless network poses unique challenges compared to other types of data, such as video, text, or data files. Most of the issues stem from the nature of sound itself, the way human hearing processes sound, and the way that speakers reproduce it.

When audio is recorded digitally, it is measured and quantized (through analog-to-digital conversion) into samples at a fast enough rate to allow the signal to be reproduced with little or no degradation. When the digitally recorded audio is reproduced (via digital-to-analog conversion) and played through speakers, the sound can be a perfect (or near-perfect) reproduction of the original analog audio, provided that the conversion, amplification, and speaker system are of high enough quality. For audio, a quantization level of 24-bit samples is accepted as high enough to allow reproduction without detectable artifacts, provided that the sample rate is adequate. A sample rate of 192 kHz has been determined to be high enough to avoid any artifacts. A single channel 24-bit 192 kHz audio signal, for example, requires 4.608 MHz (24×192,000) bandwidth for transmission. A stereo pair requires two channels, so it requires 9.612 MHz bandwidth. Typical digital audio cables easily support such bandwidth.

For a wireless network to operate without interference, networking standards organize the frequency band into channels and limit channel bandwidth. In many cases the available channel bandwidth is not wide enough to support uncompressed audio, so audio is compressed. Compression is the process in which some of the audio data is omitted so that it can be transmitted at a lower data rate (or so that it takes up less storage space). Compression is typically accomplished by reducing the number of quantization bits (e.g.; 24 bits to 16 bits) and/or by reducing the number of samples. Compression can create some audible artifacts compared with the corresponding uncompressed reproduction. Certain compression techniques eliminate high frequencies and/or low frequencies through filtering. Certain compression techniques can result in additional noise in the reproduced signal.

Another issue associated with audio is latency. As depicted in FIG. 4, latency is the elapsed time from when audio is played to when it reaches the ears of the listener. Latency occurs normally in audio due to the speed of sound because sound travels about one foot per millisecond, whereas light travels about one million times faster (one nanosecond per foot). A listener at a live concert experiences latency when he or she hears the words after seeing the singer's lips move because sound travels slower than light.

Real-time audio applications are those where audio synchronization is important. For example, musicians performing on stage can feel the delay between when they play a note and when they hear it. A person making a speech with a microphone can hear the delay from when they talk to when they hear themselves. A typical human cannot perceive latency of less than about 15 milliseconds, so if audio arrives at the ear within 15 milliseconds after that human "knew" the audio was created the audio will seem to be "in sync"; for example, if one were watching television and listening to the audio.

Latency in wireless audio occurs because a transmitter requires time to convert the audio provided by an audio source into radio waves, and a receiver requires time to convert radio waves into an audio signal to be played by speakers. The amount of latency in different technologies varies from a few milliseconds to hundreds of milliseconds, and in some cases is measured in seconds.

In sound systems, audio signals are often sent from a source to a destination that processes the audio, then forwards it to another destination, then another, etc., until it arrives at a speaker where it is played. Each of these nodes adds some latency, and as the latency compounds, the system can become unusable.

It is impossible to completely eliminate latency in a wireless system. However, reducing audio latency to less than 1 millisecond would allow cascading of wireless transmitter/receiver pairs to extend the range or to allow the replacement of cables in complex wired arrangements.

As depicted in FIG. 5, when audio is sent from one source to multiple receivers, for example, when playing music on several speakers, the audio quality diminishes if audio isn't played on all speakers in synchronization. Audio listeners experience a failure of this type as noise during quiet segments (lack of a dark sound stage) and "muddiness" during louder segments of music (poor imaging).

General digital file transfers between nodes in a standard Wi-Fi network can easily tolerate packet delays, re-transmissions, and the associated latency and/or jitter, but a live audio stream has certain characteristics that can make the latency and/or synchronization unacceptable when using a standard Wi-Fi channel. The versatility of Wi-Fi comes with the cost of additional processing and delays as each node in the network must examine the data, determine whether it is the final destination for the data, and then process it. The Wi-Fi standard's requirement to support file transfers, streaming, and internet communications creates limitations for its use in audio transmission. To accommodate the many different data types and formats, information is encapsulated with metadata describing the content. Data is packetized and padded with routing information to support internet protocol and wide area networks. The consequence of all this processing is that the current Wi-Fi architecture cannot achieve the range, quality, low latency, and tight synchronization required for real-time wireless audio.

The traditional approach to Wi-Fi networks emerged from several requirements: (a) the ability to handle data in various formats (files, messages, streams); (b) the ability to support various content types (video, data, voice); (c) the ability to support Wide Area Networks of various type (wired, wireless, hybrid); (d) the ability to support various types of hardware (computers, routers, hubs, phones); and (e) the ability to support various packet types and/or networking protocols.

The need to support unknown and unlimited network and data configurations has forced an implementation of wireless networking that is modeled off the OSI 7-layer model. The layered approach to networking is extremely versatile and resilient, but it is hostile to real-time audio transmission.

A need exists for a wireless audio system that can provide secure, tight synchronization among all receivers with minimal latency.

BRIEF SUMMARY

The disclosed technology provides improved performance and quality in the distribution of wireless audio by limiting the corresponding data to a predetermined digital format in which OSI protocol layers in the communications process are optimized for minimum payload overhead and processing. Certain implementations utilize an architecture in which one or more configurable hubs and nodes may be utilized to provide a robust and secure pairing process.

Certain exemplary implementations of the disclosed technology include a wireless audio distribution system. The system includes a configurable software-defined hub, a hub processor, and hub memory. The system includes one or more configurable software-defined nodes configurable for communication with the configurable software-defined hub, each node of the one or more configurable software nodes comprising a corresponding node processor and node memory. The hub memory stores instructions that cause the configurable software-defined hub to receive a pairing initiation signal to connect with at least one node of the one or more configurable software-defined nodes; receive, from the at least one node, a plurality of node identifiers; authorize the at least one node based on a comparison of the plurality of node identifiers and identifier data stored in the hub memory, and securely pair the configurable software-defined hub with at least one authorized node. The system includes a software-defined transceiver chain comprising a configurable hub transmitter and authorized node receiver, wherein the hub transmitter is configured to utilize a modified Logical Link Control (LLC) layer and an unmodified Media Access Control (MAC) layer of an Open System Interconnect (OSI) protocol to communicate data in a predetermined format from the configurable hub transmitter to the authorized node receiver.

The disclosed technology includes a method. The method includes receiving, at a configurable software-defined hub, a pairing initiation signal to connect the configurable software-defined hub with at least one node of one or more configurable software-defined nodes; receiving, from the at least one node, a plurality of node identifiers; authorizing the at least one node based on a comparison of the plurality of node identifiers and identifier data stored in the hub memory; securely pairing the configurable software-defined hub with at least one authorized node; configuring a software-defined transceiver chain comprising a configurable hub transmitter and an authorized node receiver with a modified Logical Link Control (LLC) layer and an unmodified Media Access Control (MAC) layer of an Open System Interconnect (OSI) protocol and communicating data in a predetermined format from the configurable hub transmitter to the authorized node receiver.

The disclosed technology includes a non-transitory computer-readable medium including processor-executable instructions, which when executed by a processor, instruct a wireless audio distribution system to perform a method comprising: receiving, at a configurable software-defined hub, a pairing initiation signal to connect the configurable software-defined hub with at least one node of one or more configurable software-defined nodes; receiving, from the at least one node, a plurality of node identifiers; authorizing the at least one node based on a comparison of the plurality of node identifiers and identifier data stored in the hub memory; securely pairing the configurable software-defined hub with at least one authorized node; configuring a software-defined transceiver chain comprising a configurable hub transmitter and an authorized node receiver with a modified Logical Link Control (LLC) layer and an unmodified Media Access Control (MAC) layer of an Open System Interconnect (OSI) protocol and communicating data in a predetermined format from the configurable hub transmitter to the authorized node receiver.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale, and wherein.

DETAILED DESCRIPTION

Various example embodiments of the disclosed technology now will be described more fully hereinafter with reference to the accompanying drawings, in which some, but not all embodiments of the disclosure are shown. This technology may, however, be embodied in many different forms and should not be construed as limited to the implementations set forth herein; rather, these implementations are provided so that this disclosure will be thorough and complete, and will convey the scope of the disclosed technology to those skilled in the art.

Figure 1:
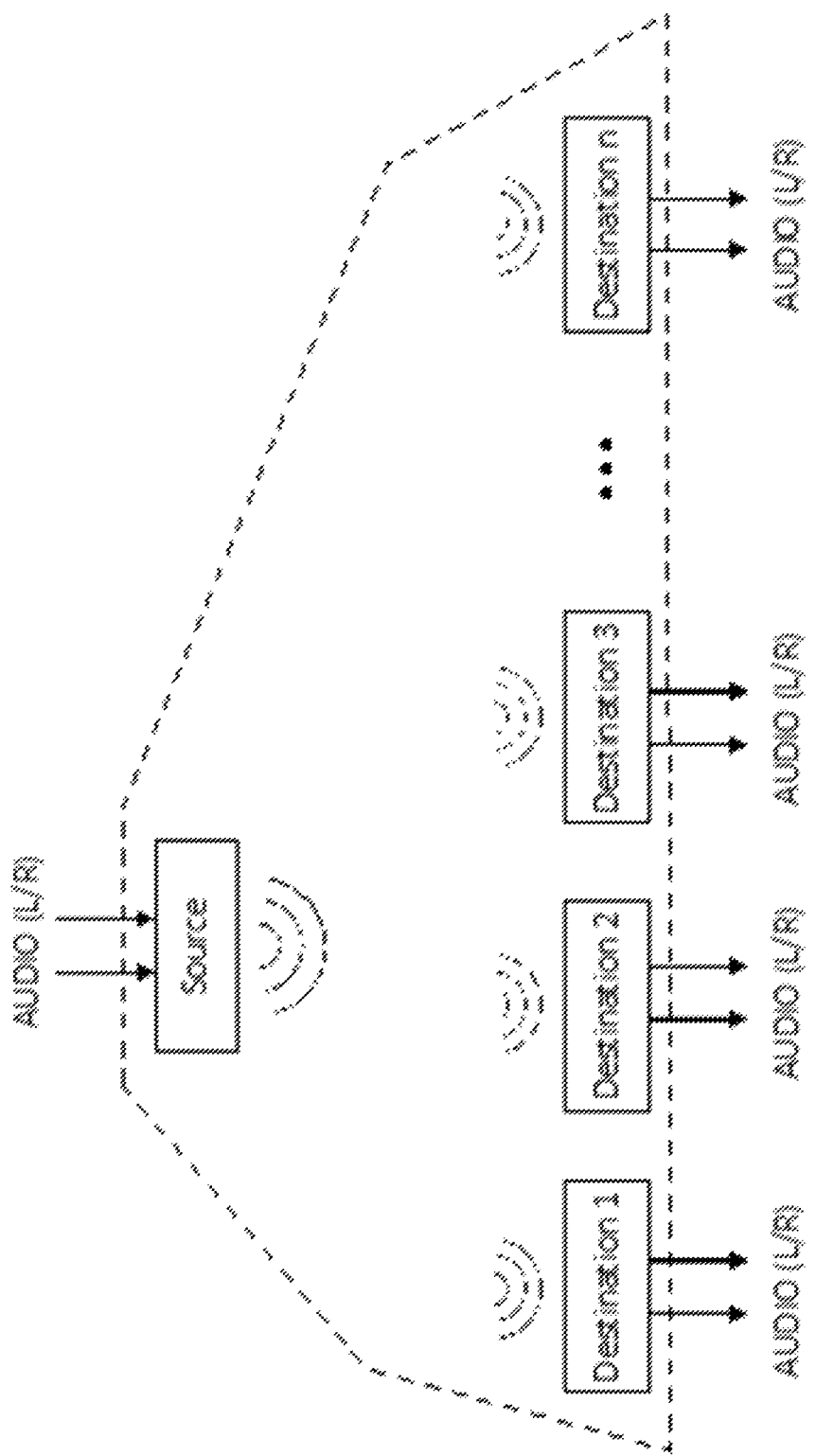
FIG. 1 depicts a 1 to N wireless audio system or scenario in which a single source broadcasts audio to multiple destinations where the signal may be received for reproducing audio at multiple locations.
Figure 2:
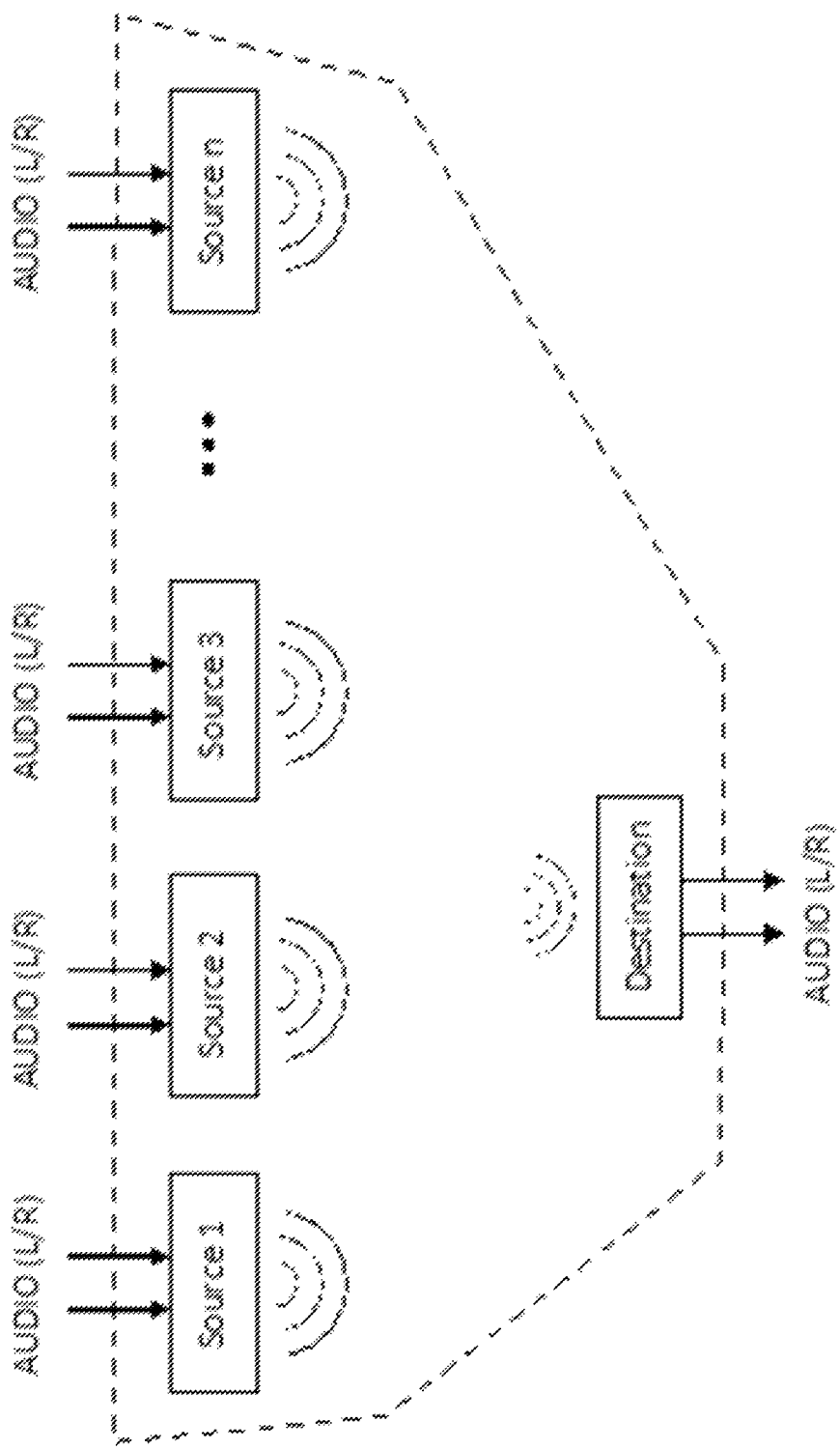
FIG. 2 depicts an N-to-1 wireless audio system or scenario in which multiple sources broadcast signals to a single destination where the signals may be received for reproducing audio at a single location.
Figure 3:
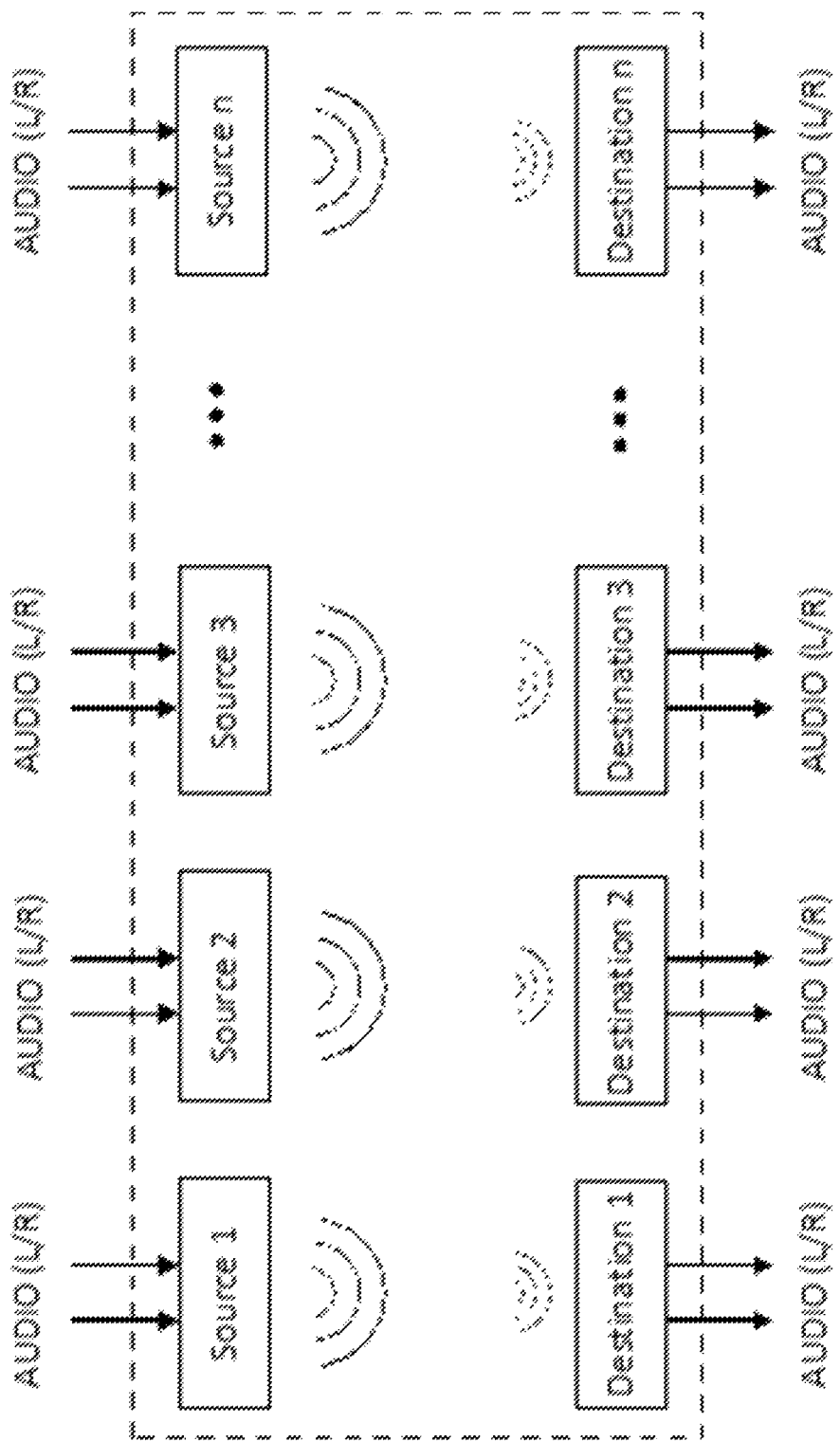
FIG. 3 depicts an N-to-N wireless audio system or scenario in which any of the multiple sources broadcast signals to all or any selected destinations where the source signals may be received for reproducing audio at one or more of the selected multiple locations.
Figure 4:
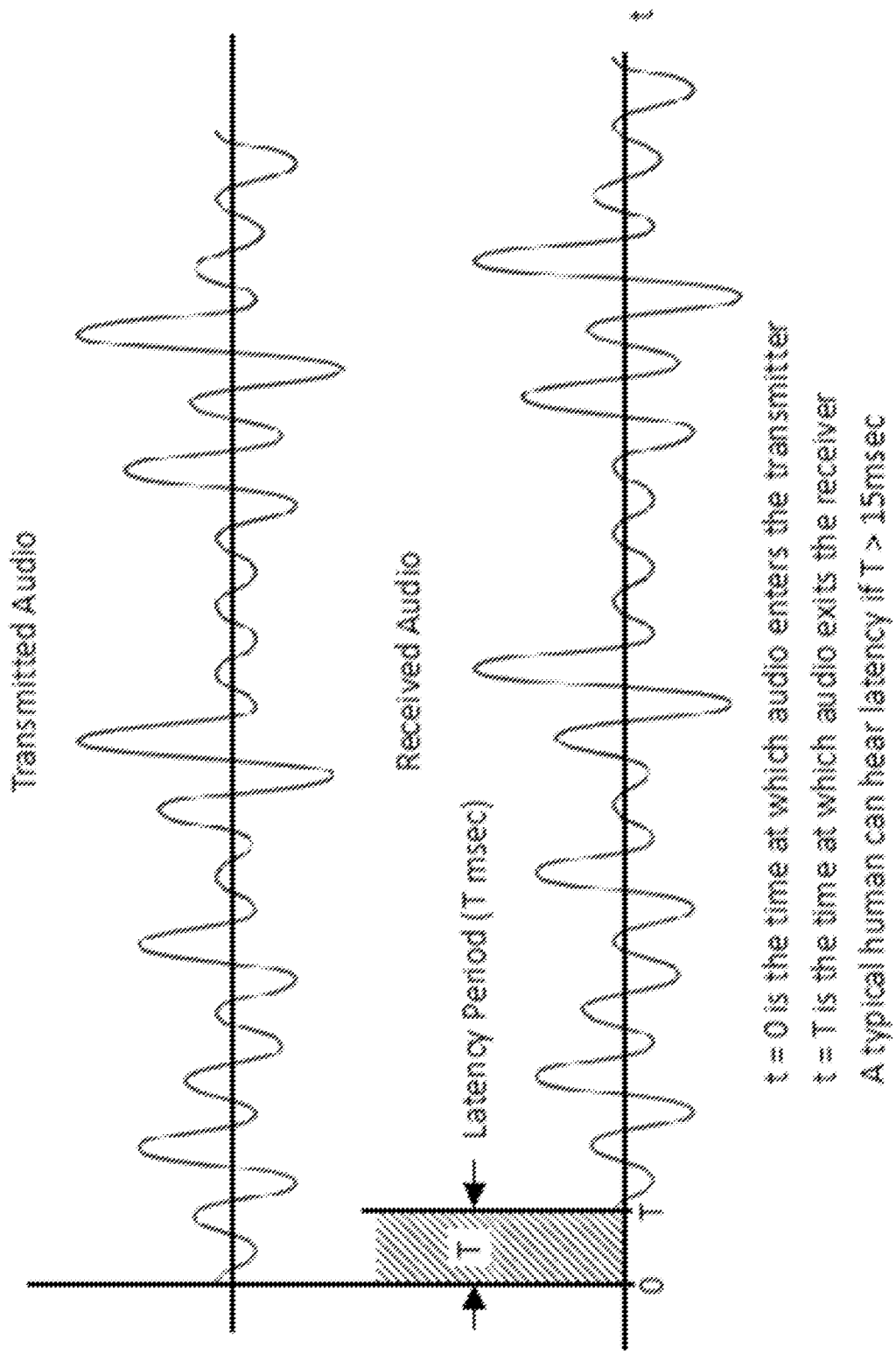
FIG. 4 depicts a transmitted audio signal and associated latency in the received or reproduced audio signal.
Figure 5:
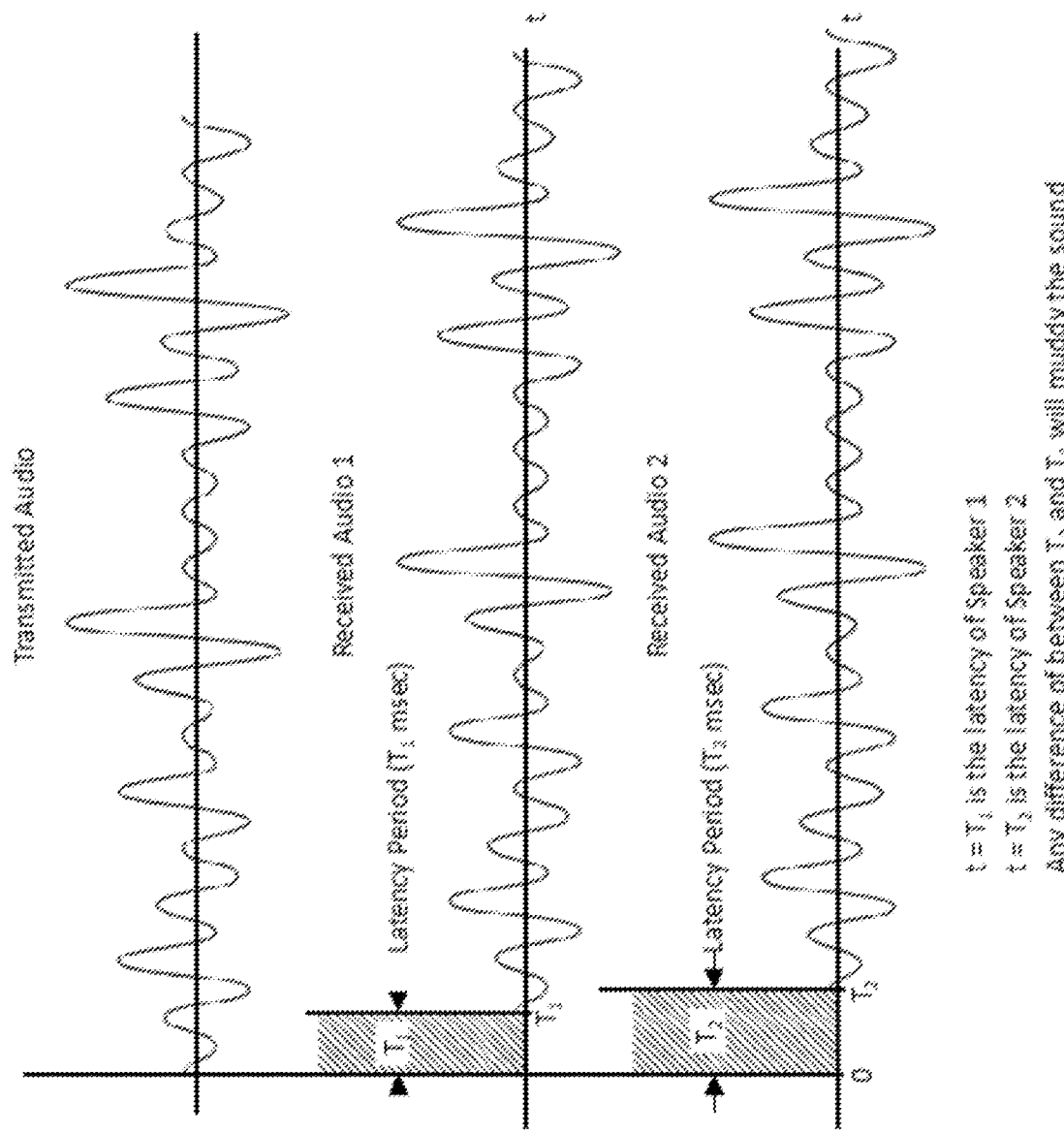
FIG. 5 depicts a transmitted audio signal and associated latencies at two received or reproduced audio signals.

The disclosed technology enables a wireless audio system with an audio networking technology that supports many source and destination nodes, with extraordinarily high quality, maximum transmission distance (range), and the lowest latency possible. The disclosed technology solves long-felt needs and enables many new audio applications that have previously been impossible. The disclosed technology further solves certain complex issues that can arise in audio distribution when selecting the nodes to include or exclude from the network and can enable easy and rapid configuration of 1-to-N, N-to-1, and/or N-to-N architectures, as illustrated in FIGS. 1-3. Previous wireless audio technologies lack the addressing and security needed to implement and/or reconfigure systems of this complexity.

Certain implementations of the disclosed technology utilize a wireless audio network to transmit one type of data, in a known format (for example, Inter-IC Sound) to receivers in a physically contiguous space. A physically contiguous space, as defined herein, is any space where radio frequency signals can be transmitted and received without needing to be retransmitted. The physically contiguous space may span rooms or buildings.

Certain exemplary implementations of the disclosed technology may utilize some aspects of the 802.11 Wi-Fi standard, which defines the operation of the most universally available wireless network. The Wi-Fi standard is constantly being improved and it provides increased bandwidth with every revision of the standard.

In accordance with certain exemplary implementations of the disclosed technology, the term "speaker" may be utilized to represent the endpoint or destination of an audio source in which audio may be reproduced. The term "speaker" may include a destination receiver, amplifier, power supply, and one or more drivers such as woofers, tweeters, subwoofers, midrange speakers, etc.

Figure 6:
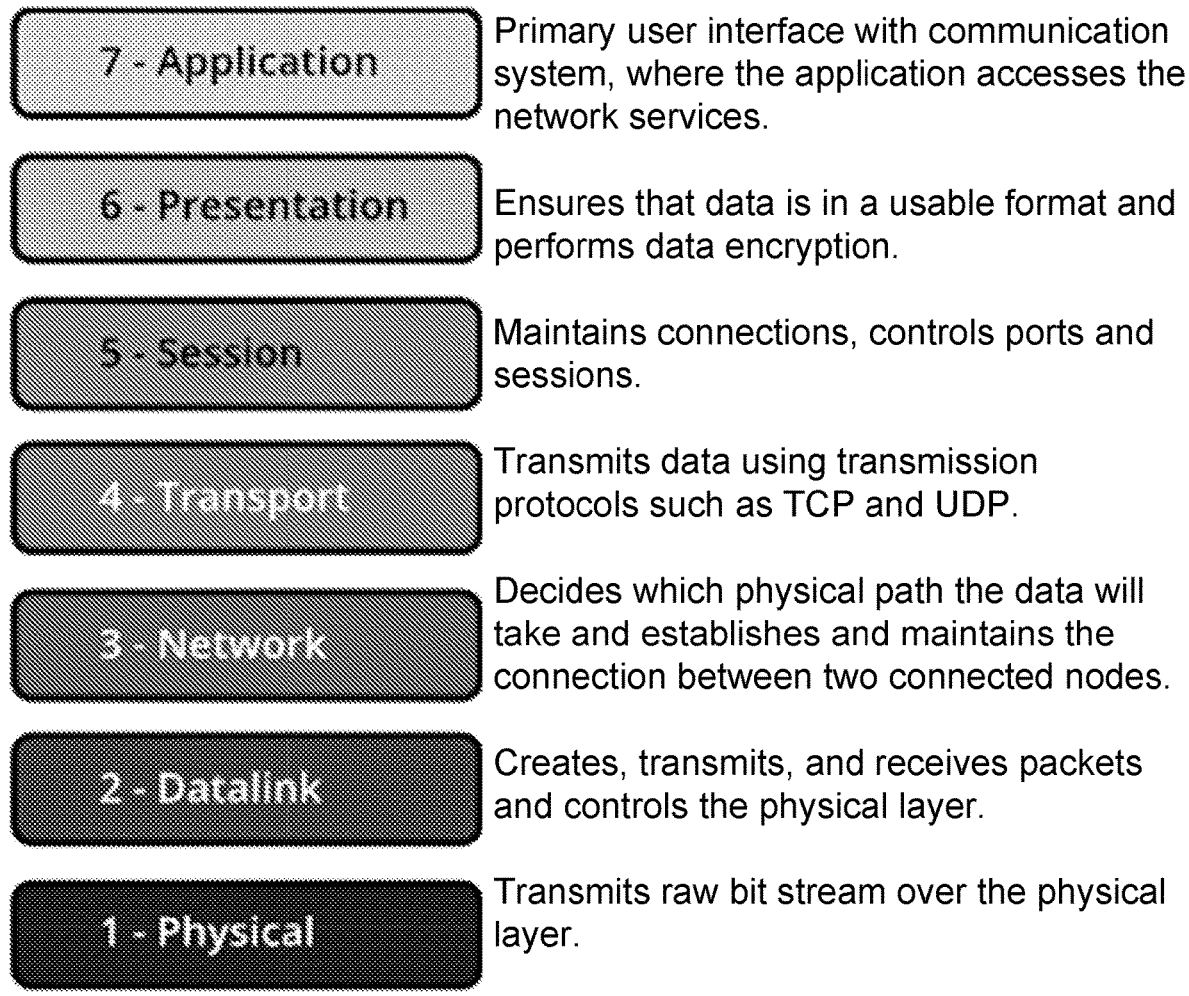
FIG. 6 illustrates the typical Open Systems Interconnection (OSI) model.

FIG. 6 illustrates the typical Open Systems Interconnection (OSI) model. The OSI model describes seven layers that computer systems use to communicate over a network. The OSI was the first standard model for network communications, and it is still widely used, as it helps visualize and communicate how networks operate and helps isolate and troubleshoot networking problems.

The OSI layered model applies to both wired and wireless networks; however, to simplify the discussion we will limit our discussion to wireless networks. The following provides a basic description of the seven network layers, starting with layer 7 and ending with layer 1.

Layer 7, also known as the Application Layer, is used by end-user software such as web browsers and email clients. This layer provides application services for file transfers, e-mail, and other network software services. Telnet and FTP are applications that exist entirely at the application level. Tiered application architectures are part of this layer. Layer 7 application examples include browsers, NFS, SNMP, Telnet, HTTP, and FTP.

Layer 6, also known as the Presentation Layer, defines how two devices should encode, encrypt, and compress data so it is received correctly on the other end. The presentation layer takes any data transmitted by the application layer and prepares it for transmission over the session layer.

Layer 5, also known as the Session Layer creates communication channels, called sessions, between devices. It is responsible for opening sessions, ensuring they remain open and functional while data is being transferred, and closing them when communication ends. The session layer can also set checkpoints during a data transfer so that if the session is interrupted devices can resume data transfer from the last checkpoint.

Layer 4, also known as the Transport Layer, provides a transparent transfer of data between end systems, or hosts, and is responsible for end-to-end error recovery and flow control. It ensures complete data transfer. Layer 4 Transport examples include SPX, TCP, and UDP.

Layer 3, also known as the Network Layer, handles switching and routing technologies and creates logical paths, known as virtual circuits, for transmitting data from node to node. Routing and forwarding are functions of this layer, as well as addressing, internetworking, error handling, congestion control, and packet sequencing. Layer 3 Network examples include AppleTalk DDP, IP, and IPX.

Layer 2, also known as the Datalink Layer, establishes and terminates a connection between two physically connected nodes on a network. It breaks up packets into frames and sends them from source to destination. This layer is composed of two parts—Logical Link Control (LLC), which identifies network protocols and performs error checking and synchronizes frames; and Media Access Control (MAC) which uses MAC addresses to connect devices and define permissions to transmit and receive data.

Layer 1, also known as the Physical Layer, is responsible for the physical cable or wireless connection between network nodes. It defines the connector, the electrical cable, or wireless technology connecting the devices, and is responsible for the transmission of the raw data, which is simply a series of 0 s and 1 s while taking care of bit rate control.

Certain exemplary implementations of the disclosed technology utilize two features to provide a technical advantage and an improvement in audio distribution performance: (1) transmission of only one type of data in a known format, and (2) no transmission of the data outside of the local wireless physical space (contiguous space).

The benefit of the advantages cited above is that Layers 3-7 and half of Layer 2 (Logical Link Control) perform activities that can be eliminated, bypassed, or that can be modified to improve quality, speed, synchronization, and range. In accordance with certain exemplary implementations of the disclosed technology, Layers 3-7 may be eliminated, and the typical processing in Layer 2 may be substantially modified. These changes are explained in more detail below.

Figure 7:
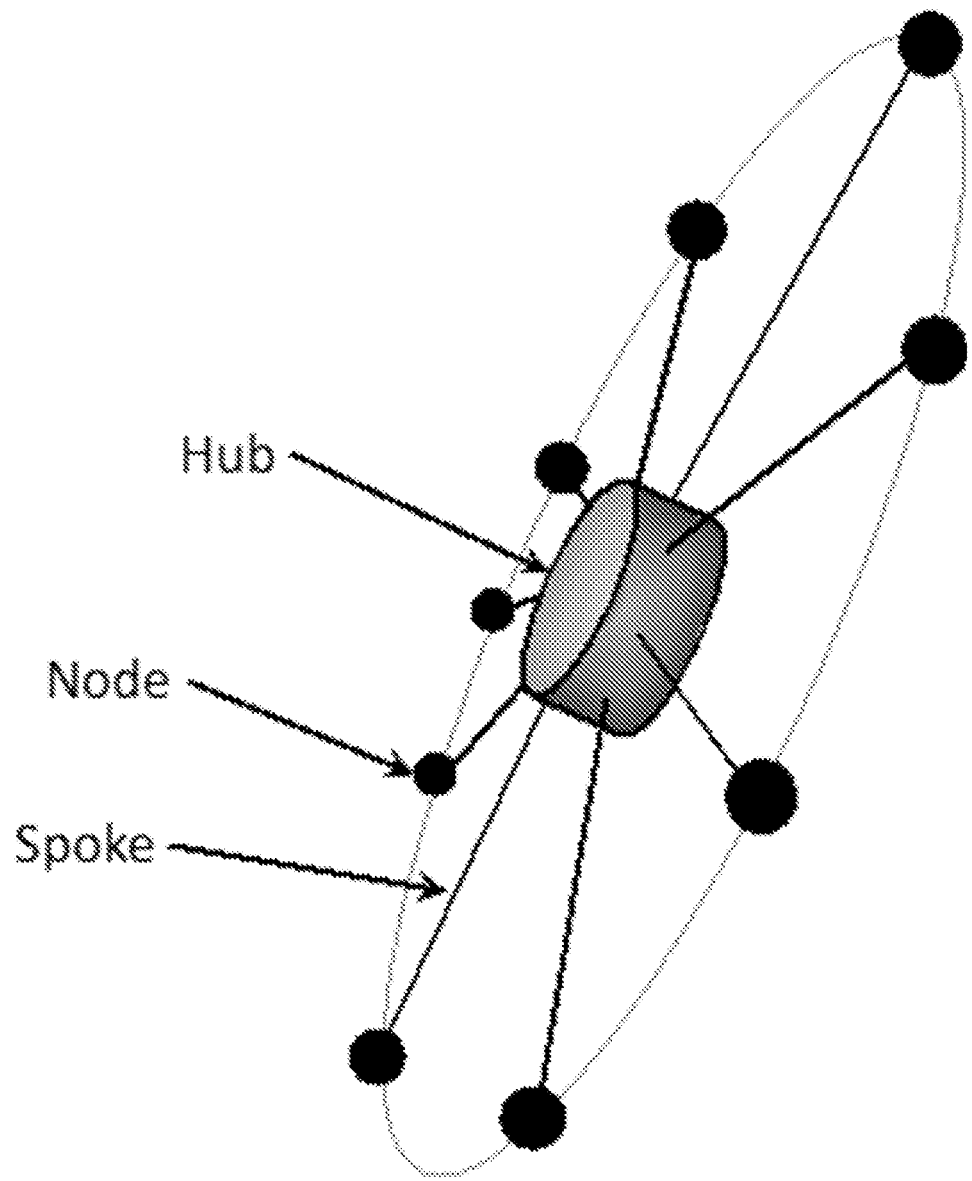
FIG. 7 depicts an arrangement having a hub, spokes, and nodes for wireless audio communications in accordance with certain exemplary implementations of the disclosed technology.

FIG. 7 depicts an example implementation of the disclosed technology using a metaphorical concept of a wheel having a Hub, Spokes, and Nodes for wireless audio communications. Consistent with this disclosure, a Hub in the wireless audio network may be configured to control the flow of data to or from a Node; the Node may transmit and/or receive data under the control of the Hub, and a Spoke represents the communication path or channel between a Hub and one Node.

In accordance with certain exemplary implementations of the disclosed technology, both Hubs and Nodes can be either transmitters or receivers. However, according to certain implementations, if a Hub is a transmitter, all Nodes may be receivers. In certain implementations, if the Hub is a receiver, then all Nodes may be transmitters.

FIG. 7 depicts a single Hub with nine Nodes attached to it. In accordance with certain exemplary implementations of the disclosed technology, the Hub may be a music source transmitting to nine speakers, for example. In another exemplary implementation, the Hub could be one speaker with nine microphones transmitting to it. As will be appreciated by those having average skill in the art of audio distribution, the Hub-Spoke-Node concept may be used to represent many other audio configurations.

Figure 8:
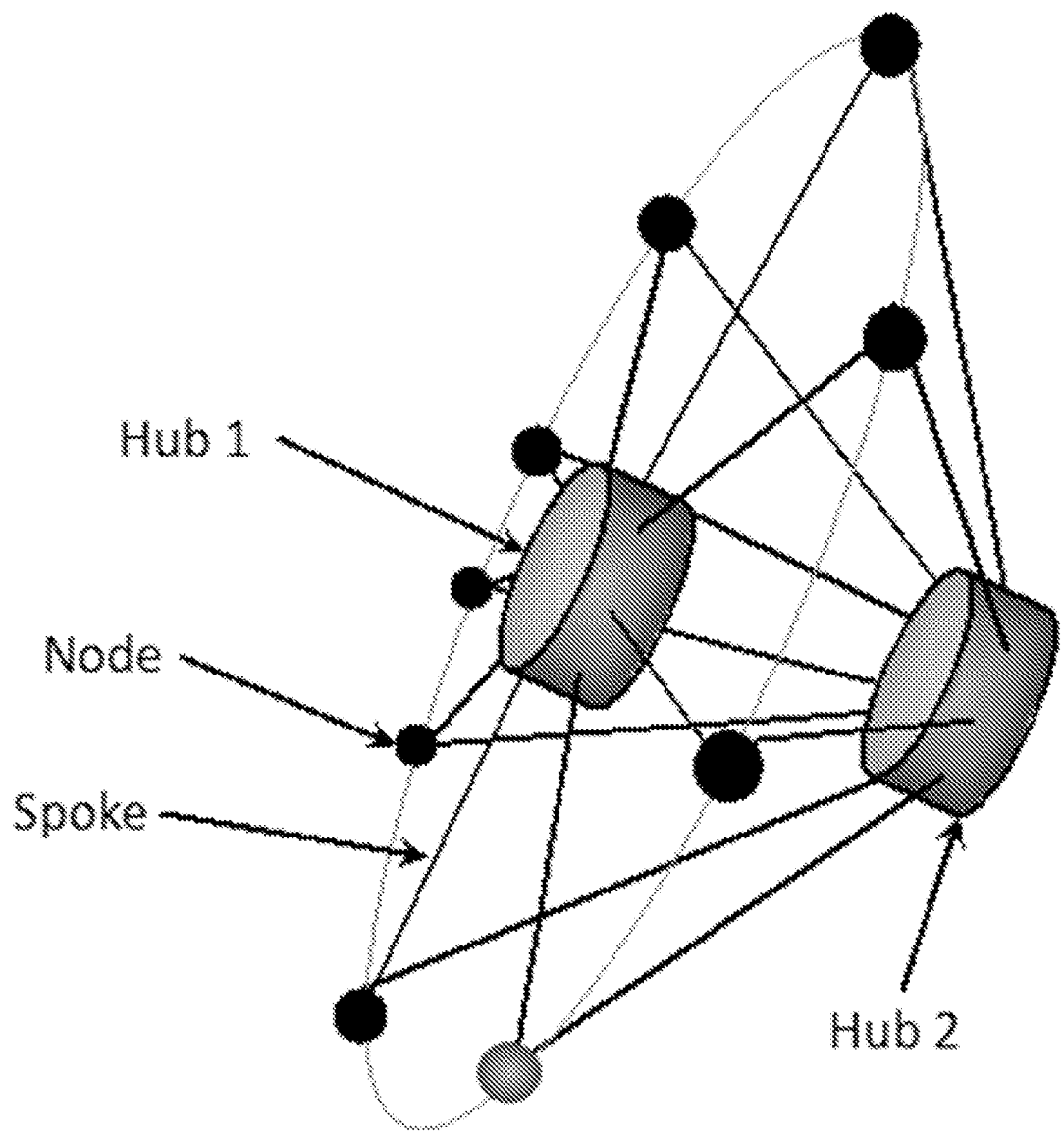
FIG. 8 depicts an arrangement having a double hub, spokes, and nodes for wireless audio communications in accordance with certain exemplary implementations of the disclosed technology.

FIG. 8 depicts an arrangement having multiple Hubs with associated Spokes, and common Nodes for wireless audio communications in accordance with certain exemplary implementations of the disclosed technology. As in the single-Hub arrangement discussed above with reference to FIG. 7, both Hubs and Nodes can be configured to be either transmitters or receivers. However, in one example implementation, if one or more of the Hubs are configured as transmitters, then all Nodes may be configured as receivers. Conversely, in another example implementation, if one or more of the Hubs are configured to be receivers, then all Nodes may be configured as transmitters.

Certain implementations may allow for configuring a mixture of assignable Hubs and assignable Nodes to provide a configurable blend of the implementations disclosed above. In the example configuration shown in FIG. 8, each Node can be configured to allow more than one Hub to attach to it at the same time. Thus, certain exemplary embodiments of the disclosed technology may enable several microphones and music sources to act as sources for simultaneously playing audio from more than one speaker. In an example implementation, a first Hub could be a microphone and a second Hub could be a mobile phone playing audio. Both the microphone and the mobile phone may transmit their respective signals to multiple speakers simultaneously for sound reproduction. In other implementations, the disclosed technology may provide a combination of long-range and low latency to enable a wireless audio system that may, for example, cover an entire parade route where a speech made by a keynote speaker (and/or music) could be sent from the front of the parade, through multiple relay points, all the way to the end of the parade. Other exemplary arrangements of the disclosed technology may be configured, for example, to provide a system for use in a high-rise apartment complex with many residences where each residence could be configured, as needed, as a Hub and/or Node on a wireless network for providing intercoms, music distribution, alarms, etc. As will be appreciated by those having skill in the art, the wireless feature of the disclosed technology may provide a significant advantage in such use cases as it may eliminate the need for connecting communication wires between Hubs and Nodes.

Figure 9:
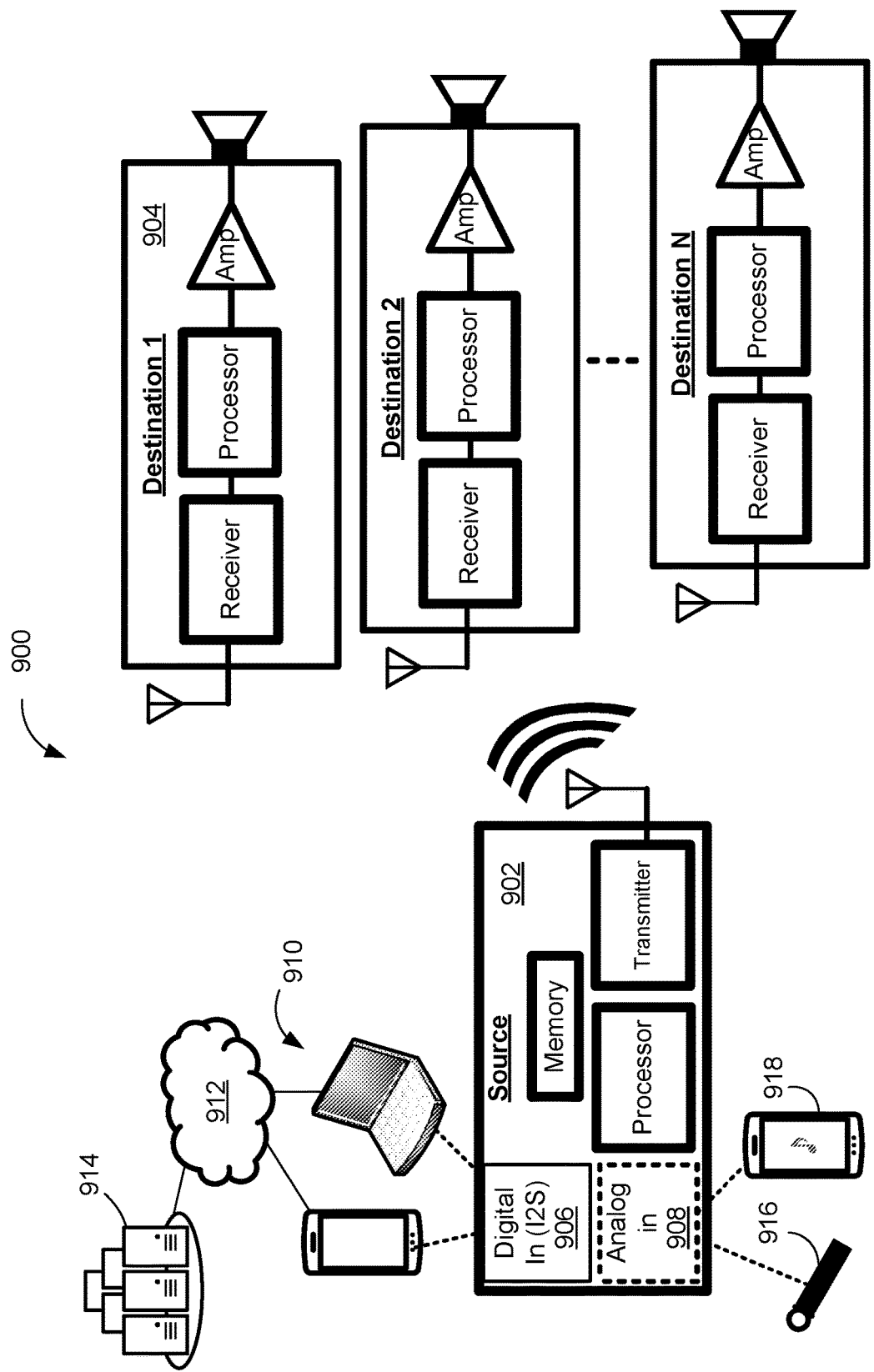
FIG. 9 depicts a single source to multiple destinations (1-to-N) audio distribution system, in accordance with certain exemplary implementations of the disclosed technology.

FIG. 9 depicts a single source 902 to multiple destinations 904 (1-to-N) audio distribution system 900, in accordance with certain exemplary implementations of the disclosed technology. While this distribution system 900 may correspond to the system of FIG. 1, it is to be understood that the disclosed technology may use similar components and arrangements to configure N-to-1 systems (as depicted in FIG. 2) and/or N-to-N systems (as depicted in FIG. 3).

According to certain exemplary implementations, the source component 902 may include a digital input section 906 that can be configured to receive digital audio data (for example Inter-IC Sound ($I^2S$) data) from an external source 910. In some implementations, the external source 910 may receive and pass along audio data from a remote server 914 (for example, from a streaming service) via the internet 912. The source component 902 may further process the digital data for transmission to selected destinations 904.

In certain exemplary implementations, the source component 902 may include an analog input section 908, including a preamp and A/D converter (not shown) that can be configured to receive analog audio (for example, from a microphone 916, music player 918, or another analog source such as a guitar) and digitize/process the analog input for transmission to selected destinations 904.

As depicted in FIG. 9, the destinations 904 may include one or more of a receiver, a processor (which can include a D/A converter—not shown), and an amplifier for preparing the signal to drive a speaker.

Certain technical details of the disclosed technology, particularly with regard to how the digital data is processed, will now be further explained in reference to the OSI model discussed above with reference again to FIG. 6.

As message packets traverse the network during transmission, the upper layers (layers 5-7) normally pack and encrypt messages and attach metadata to the packets so that the receiving medium knows how to unpack and decrypt them. As the packets move to each lower layer, they are further packed and encrypted. When audio is streamed from an audio application like Spotify, for example, (or a video platform such as YouTube) the audio data (and/or video data) is sent from the Content Distribution Network (which may correspond to the remote server 914 in FIG. 9) to a receiving IP device such as a computer, smartphone, etc. (which may correspond to the devices 910 in FIG. 9). The receiving IP device unpacks and decrypts the audio data may send it to our source device (such as the source 902 in FIG. 9) in a known format—in the case of Audio, I2S.

In accordance with certain exemplary implementations, the I2S data may then be transmitted wirelessly to a receiving (destination) device 904 without such data being transmitted over the internet. Layers 5-7 deal with structuring and sending information over an IP-based wide area network for internet applications. One specific objective of the disclosed technology, as mentioned previously, is handling the transmission of data of only one type (in this case, audio) between devices in a contiguous physical allows us to eliminate all of the processing in Layers 5-7 (and, as will be explained, Layers 3-4).

Typically, when a message arrives at Layer 4 to ultimately be sent to a receiving device, the data may be packed and encrypted into a message that is compatible with the Internet. Layer 4 formats the data for network traffic and encapsulates it with metadata describing the format and sends it to Layer 3. Layer 3 looks for where the message should be routed and prepares it to be sent to the IP address specified by the layers above it.

In contrast to this typical processing, certain implementations of the disclosed technology may send audio data in a physically contiguous space either from one transmitting device (such as a source 902) to one or more receiving devices (e.g., speakers, or destination devices 904) or from one or more transmitting devices to one receiving device. Certain exemplary implementations of the disclosed technology limit the transmission of the data wirelessly within a contiguous physical space, so there is no need for routing functionality.

Layers 3 and 4 deal with formatting the data for network traffic and then preparing it for routing over a wide area network. The network protocol and routing support in Layers 3 and 4 are unnecessary when messages are not forwarded to unknown devices across a wide area network. The disclosed technology provides transmitting data of only one type (in this case, audio) between devices in a contiguous physical network which allows the elimination of all of the processing in Layers 3 and 4

Layer 2, the Datalink layer, functions at two sublayers: the Logical Link Control (LLC) and Media Access Control (MAC), which have been described earlier. In certain exemplary implementations, the operation of the MAC sublayer is not modified, however, the LLC sublayer may be substantially modified. The modification of the LLC sublayer will now be described in the following sections.

The Logical Link Control (LLC) sublayer performs the processing that enables support for several network protocols to coexist within a multipoint network and to be transported over the same network medium. The LLC also provides flow control and automatic repeat request (ARQ) error management mechanisms.

According to an exemplary implementation of the disclosed wireless audio architecture, only a specific network protocol may be supported for sending audio packets of known type and size across the wireless network. This enables the elimination of a significant amount of processing overhead and reduces the metadata overhead needed to identify multiple network protocols, resulting in improvements in speed (latency), data capacity, and timing synchronization.

The wireless audio network technology, as disclosed here, makes substantial modifications to the LLC sublayer to implement a custom security methodology, to select which wireless audio devices are allowed to join the network, and to enable more than one Hub to operate in the same physical space.

Certain exemplary implementations of the disclosed technology may be used in applications that require secure communications, including, but not limited to military radios and aircraft communication. In such applications, it is important to prevent bad actors from sniffing the network to gain access to audio communications to listen or to insert audio on the network.

Even when a device has the appropriate authorization to join the network, the Hubs and Nodes must negotiate to join the network. A Node—for example, a speaker—may only allow certain types of Hubs—for example, music sources—to send audio to it. The disclosed network protocol enables Nodes and Hubs to limit the types of compatible devices that can connect with them.

Certain exemplary implementations of the disclosed wireless audio networking technology can support operating separate networks within range of one another without interference for applications such as music systems in an apartment complex or dormitory.

In accordance with certain exemplary implementations of the disclosed technology, there may be two processes related to device connections to the wireless network. The initial pairing of Hubs and Nodes, and the subsequent negotiation that happens when either a Hub or Node is turned off and then back on.

In certain exemplary implementations, the first of the two processes can include the initial pairing of each Node with each Hub, and in some cases, may require a negotiation that is initiated by a user, during which the Hub and Node verify that they are authorized to connect with one another. Once they complete the process successfully, each stores the relevant information about the other in non-volatile storage so that subsequent connections are made without user interaction.

The second of the two processes is the pairing of a Node with a Hub after they have previously been paired. A negotiation still occurs to verify that the Node and Hub are who they say they are. Then, they each may inspect their list of connected devices and join connect to one another immediately without user involvement.

To facilitate these two processes, certain implementations may utilize a tiered access methodology. The methodology can employ at a minimum of four addresses or identifiers to support many anticipated network security requirements and segmentation objectives. The four addresses or identifiers can include: (1) a MAC Address, which is a unique identifier for the wireless network device; (2) a Network ID, which is an identifier that indicates that the network device is compatible with all other network devices that contain it. The Network ID may indicate that the device could connect with any other device with this ID stored in it, provided that all other security and segmentation conditions are met; (3) a Manufacturer ID, which is a unique identifier that each product manufacturer may program into a wireless chip to tag the product as manufactured by them; and (4) a Product ID, which is an identifier that a manufacturer may program into their device to tag the device as a product.

To enforce security, and in accordance with certain exemplary implementations, a combination of the MAC Address and the Network ID may be used to filter out any unauthorized traffic. The security methodology may use an encrypted hash of the two codes to prevent bad actors from injecting audio or listening to it.

In certain exemplary implementations, a $3^{rd}$ party manufacturer may configure a network device with a list of the Manufacture IDs that are allowed to connect to it. The list may be updated afterward to support new Manufacturer IDs. This may be used to allow the manufacturer to limit the types of devices that can connect with one another. For example, a speaker manufacturer may want to allow only their own transmitter to operate as a hub with their speakers; however, if in the future they want to allow another manufacturer to produce a compatible transmitter they can add the new Manufacturer to the list.

In certain exemplary implementations, the Product ID may be used to allow a manufacturer to produce different products that cannot connect with one another. They may have a secure audio system that must operate independently of a non-secure system in the same physical space. While the functionality could be implemented through pairing, using the Product ID in this way makes inadvertent pairing impossible.

As discussed herein, the elimination of Layers 3-7 and the previously described modifications of the Layer 2 LLC sublayer vastly increase the speed and reduce the latency, which are the aspects of the disclosed technology that make tight timing synchronization possible. Additionally, certain implementations of the disclosed technology may augment the synchronization functionality by allowing the network to be configured with defined delays to the different nodes in the network. This may be accomplished in the Logical Link Control (LLC) sublayer by configuring the audio frame buffer size. The audio delay, for example, is determined by the audio data buffer size (number of samples sent per transmission), the number of bits per audio sample, and the audio data rate; each of which is configurable by the end-user of the disclosed device (for example, buffer size can be from 500 to 5,000 samples, number of bits per sample can be 16 bits or 24 bits, and audio data rate can be 48 kHz, 96 kHz, or 192 kHz). The audio delay can be computed by multiplying the number of audio bits per sample by the audio data buffer size and dividing the result by the audio data rate. Accordingly, the control of the audio frame buffer allows significant control of the audio delay. To accommodate applications that require audio synchronization among the Nodes, certain implementations may configure different delays in each Node. In some implementations, the audio delay configurations may be configured manually through a user interface or through software that computes required delays and automatically configures the delay for each Node.

Certain exemplary implementations of the disclosed wireless audio network may take advantage of the robust functionality of the Media Access Control (MAC) sublayer without any modification. The MAC sublayer performs data encapsulation into frames appropriate for the wireless transmission, adds a frame check sequence for error detection, and forwards the data to the physical layer when the channel access method permits it. The MAC is also responsible for retransmission in case of error detection. When receiving data from the physical layer, the MAC block ensures data integrity by verifying the sender's frame check sequences and strips off the sender's preamble and padding before passing the data up to the higher layers.

Certain exemplary implementations of the disclosed wireless audio network take advantage of the robust functionality of the Physical Layer (Layer 1) without any modification. Layer 1 comprises two sub-layers, the (PLCP) Physical Layer Convergence Procedure sublayer, and the (PMD) Physical Medium Dependent sublayer. The physical layer is responsible for the radio frequency operation of the wireless connection between network nodes. It defines the wireless technology connecting the devices, the channelization of the radio communications, and is responsible for the transmission of the raw data, which is simply a series of 0 s and 1 s while taking care of bit rate control. The Physical Layer Convergence Procedure sublayer adds preamble and PHY header data. A preamble is a series of 0's and 1's modulated on the channel before a pending frame, used to synchronize radios that a pending frame is on its way. The PHY rate at which the (MPDU/PSDU) is transmitted is determined at this layer. The PMD layer uses complex modulations to deliver the coded bits. The modulations used with 802.11 are (DSSS, OFDM, MIMO-ODFM).

Figure 10:
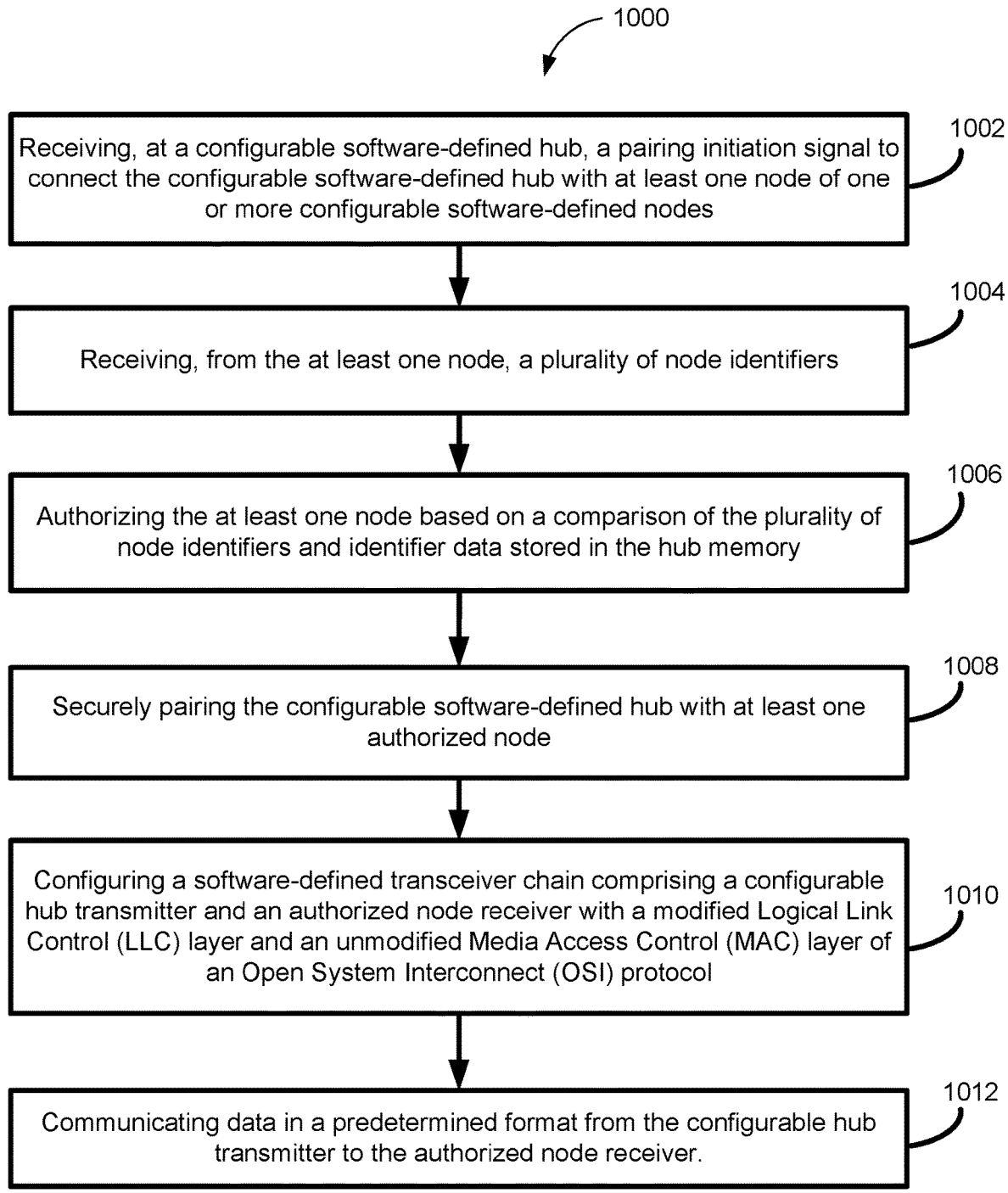
FIG. 10 is a flow diagram of a method, in accordance with certain exemplary implementations of the disclosed technology.

FIG. 10 is a flow diagram of a method 1000. In block 1002, the method 1000 includes receiving, at a configurable software-defined hub, a pairing initiation signal to connect the configurable software-defined hub with at least one node of one or more configurable software-defined nodes. In block 1004, the method 1000 includes receiving, from the at least one node, a plurality of node identifiers. In block 1006, the method 1000 includes authorizing the at least one node based on a comparison of the plurality of node identifiers and identifier data stored in the hub memory. In block 1008, the method 1000 includes securely pairing the configurable software-defined hub with at least one authorized node. In block 1010, the method 1000 includes configuring a software-defined transceiver chain comprising a configurable hub transmitter and an authorized node receiver with a modified Logical Link Control (LLC) layer and an unmodified Media Access Control (MAC) layer of an Open System Interconnect (OSI) protocol. In block 1012, the method 1000 includes communicating data in a predetermined format from the configurable hub transmitter to the authorized node receiver.

In certain exemplary implementations, the configurable hub transmitter may be configured to transmit data to the authorized node in a physically contiguous space.

In certain exemplary implementations, the predetermined format comprises Inter-IC Sound ($I^2S$).

Certain exemplary implementations of the disclosed technology can further include wirelessly receiving data at the configurable software-defined hub from at least one of the one or more configurable software-defined nodes. In some implementations, the plurality of node identifiers comprises two or more of: a MAC address; a network ID; a manufacture ID; and/or a product ID.

In certain exemplary implementations, configuring the software-defined transceiver chain comprises eliminating or bypassing layers 3-7 of the OSI protocol.

In certain exemplary implementations, communicating the data in the predetermined format from the configurable hub transmitter to the authorized node receiver does not require the data to be sent over the internet.

In certain exemplary implementations, communicating the data in the predetermined format from the configurable hub transmitter to the authorized node receiver comprises communication among known devices using known data format and does not require routing functionality over a wide area network.

In certain exemplary implementations, configuring the software-defined transceiver chain further comprises manually or automatically selectively configuring an audio frame buffer size for each destination node to control audio delay or synchronization.

In certain exemplary implementations, configuring the audio frame buffer size comprises configuring one or more of a number of samples sent per transmission, a number of bits per audio sample, or an audio data rate.

In certain exemplary implementations, the frame buffer size may be configured from 500 samples to 5,000 samples, the number of bits per sample may be configured to be 16 bits or 24 bits, and/or audio data rate may be configured to be one of 48 kHz, 96 kHz, or 192 kHz.

Figure 11:
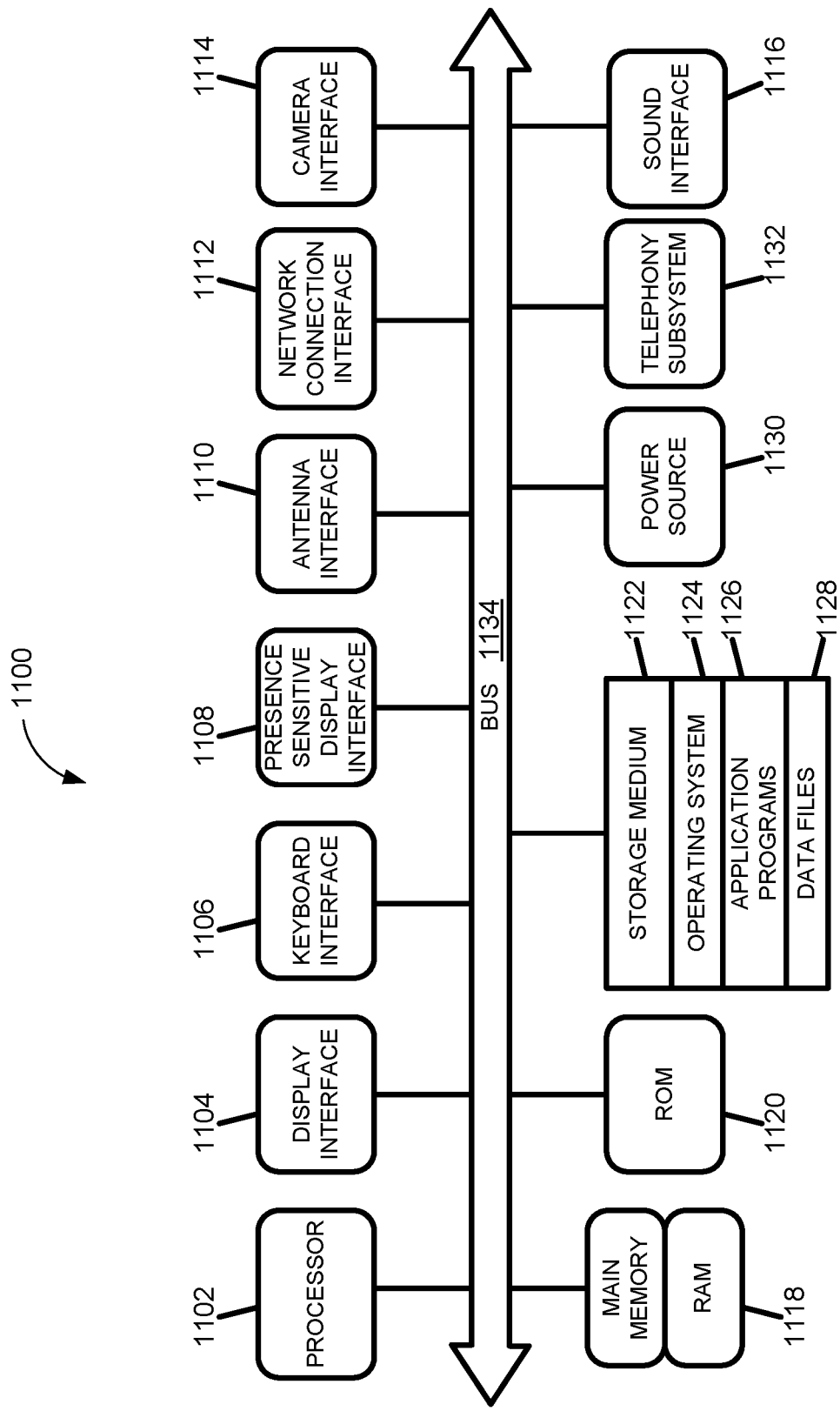
FIG. 11 depicts a processor, in accordance with certain exemplary implementations of the disclosed technology.

FIG. 11 depicts a block diagram of an illustrative computing device 1100, in which one or more of the associated components may be utilized to enable certain aspects of the disclosed technology. Various implementations and methods herein may be embodied in non-transitory computer-readable media for execution by a processor. It will be understood that the computing device 1100 is provided for example purposes only and does not limit the scope of the various implementations of the communication systems and methods.

The computing device 1100 of FIG. 11 includes one or more processors where computer instructions are processed. The computing device 1100 may comprise the processor 1102, or it may be combined with one or more additional components shown in FIG. 11. In some instances, a computing device may be a processor, controller, or a central processing unit (CPU). In yet other instances, a computing device may be a set of hardware components.

The computing device 1100 may include a display interface 1104 that acts as a communication interface and provides functions for rendering video, graphics, images, and texts on the display. In certain example implementations of the disclosed technology, the display interface 1104 may be directly connected to a local display. In another example implementation, the display interface 1104 may be configured for providing data, images, and other information for an external/remote display. In certain example implementations, the display interface 1104 may wirelessly communicate, for example, via a Wi-Fi channel or other available network connection interface 1112 to the external/remote display.

In an example implementation, the network connection interface 1112 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 1104 may be operatively coupled to a local display. In another example, the display interface 1104 may wirelessly communicate, for example, via the network connection interface 1112 such as a Wi-Fi transceiver to the external/remote display.

The computing device 1100 may include a keyboard interface 1106 that provides a communication interface to a keyboard. According to certain example implementations of the disclosed technology, the presence-sensitive display interface 1108 may provide a communication interface to various devices such as a pointing device, a touch screen, etc.

The computing device 1100 may be configured to use an input device via one or more of the input/output interfaces (for example, the keyboard interface 1106, the display interface 1104, the presence-sensitive display interface 1108, the network connection interface 1112, camera interface 1114, sound interface 1116, etc.,) to allow a user to capture information into the computing device 1100. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 1100 or may be a separate device. For example, the input device may be an accelerometer, a magnetometer, a digital camera, a microphone, and an optical sensor.

Example implementations of the computing device 1100 may include an antenna interface 1110 that provides a communication interface to an antenna; a network connection interface 1112 that provides a communication interface to a network. According to certain example implementations, the antenna interface 1110 may utilize to communicate with a Bluetooth transceiver.

In certain implementations, a camera interface 1114 may be provided that acts as a communication interface and provides functions for capturing digital images from a camera. In certain implementations, a sound interface 1116 is provided as a communication interface for converting sound into electrical signals using a microphone and for converting electrical signals into sound using a speaker. According to example implementations, random-access memory (RAM) 1118 is provided, where computer instructions and data may be stored in a volatile memory device for processing by the CPU 1102.

According to an example implementation, the computing device 1100 includes a read-only memory (ROM) 1120 where invariant low-level system code or data for basic system functions such as basic input and output (I/O), startup, or reception of keystrokes from a keyboard are stored in a non-volatile memory device. According to an example implementation, the computing device 1100 includes a storage medium 1122 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1124, application programs 1126 (including, for example, a web browser application, a widget or gadget engine, and or other applications, as necessary) and data files 1128 are stored. According to an example implementation, the computing device 1100 includes a power source 1130 that provides an appropriate alternating current (AC) or direct current (DC) to power components. According to an example implementation, the computing device 1100 includes a telephony subsystem 1132 that allows the device 1100 to transmit and receive sound over a telephone network. The constituent devices and the CPU 1102 communicate with each other over a bus 1134.

In accordance with an example implementation, the CPU 1102 has an appropriate structure to be a computer processor. In one arrangement, the computer CPU 1102 may include more than one processing unit. The RAM 1118 interfaces with the computer bus 1134 to provide quick RAM storage to the CPU 1102 during the execution of software programs such as the operating system application programs, and device drivers. More specifically, the CPU 1102 loads computer-executable process steps from the storage medium 1122 or other media into a field of the RAM 1118 to execute software programs. Data may be stored in the RAM 1118, where the data may be accessed by the computer CPU 1102 during execution. In one example configuration, the device 1100 includes at least 128 MB of RAM, and 256 MB of flash memory.

The storage medium 1122 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 1100 to access computer-executable process steps, application programs, and the like, stored on removable and non-removable memory media, to off-load data from the device 1100 or to upload data onto the device 1100. A computer program product, such as one utilizing a communication system may be tangibly embodied in storage medium 1122, which may comprise a machine-readable storage medium.

According to one example implementation, the term computing device, as used herein, may be a CPU, or conceptualized as a CPU (for example, the CPU 1102 of FIG. 11). In this example implementation, the computing device (CPU) may be coupled, connected, and/or in communication with one or more peripheral devices.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or another type of code may be loaded onto a computer, processor, or other programmable apparatus's circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, computer software, firmware, or hardware, including the structures, disclosed in this specification and their structural equivalents, or combinations of one or more of them. Embodiments of the subject matter described herein can be implemented as one or more computer programs, i.e., one or more modules of computer program instructions encoded on the computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "data processing apparatus," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or another unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flow described herein can be performed by one or more programmable processors executing one or more computer programs to perform actions by operating on input information/data and generating output. Processors suitable for the execution of a computer program include, by way of example, both general and special purpose microprocessors, and one or more processors of any kind of digital computer. Generally, a processor will receive instructions and information/data from a read-only memory or a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated into, special-purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship between client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated with a single software product or packaged into multiple software products.

Thus, particular embodiments of the subject matter have been described. Other embodiments are within the scope of the following claims. In some cases, the actions recited in the claims can be performed in a different order and still achieve desirable results. Also, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A wireless audio distribution system, comprising:
a configurable software-defined hub, a hub processor, and a hub memory;
one or more configurable software-defined nodes configurable for communication with the configurable software-defined hub, each node of the one or more configurable software-defined nodes comprising a corresponding node processor and node memory;
the hub memory stores instructions that cause the configurable software-defined hub to:
receive a pairing initiation signal to connect with at least one node of the one or more configurable software-defined nodes;
receive, from the at least one node, a plurality of node identifiers;
authorize the at least one node based on a comparison of the plurality of node identifiers and identifier data stored in the hub memory; and
securely pair the configurable software-defined hub with at least one authorized node; and a software-defined transceiver chain comprising:
a configurable hub transmitter; and
an authorized node receiver;
wherein the configurable hub transmitter is configured to utilize a modified Logical Link Control (LLC) layer and an unmodified Media Access Control (MAC) layer of an Open System Interconnect (OSI) protocol to communicate data in a predetermined format from the configurable hub transmitter to the authorized node receiver.

2. The wireless audio distribution system of claim 1, wherein the configurable hub transmitter is configured to transmit data to the authorized node in a physically contiguous space.

3. The wireless audio distribution system of claim 1, wherein the predetermined format comprises Inter-IC Sound ($I^2S$).

4. The wireless audio distribution system of claim 1, wherein the configurable software-defined hub is further configured to wirelessly receive data from at least one of the one or more configurable software-defined nodes.

5. The wireless audio distribution system of claim 1, wherein the plurality of node identifiers comprise two or more of:
a MAC address;
a network ID;
a manufacture ID; or
a product ID;
or wherein the plurality of node identifiers comprises:
a MAC address;
a network ID;
a manufacture ID; and
a product ID.

6. A method, comprising:
receiving, at a configurable software-defined hub, a pairing initiation signal to connect the configurable software-defined hub with at least one node of one or more configurable software-defined nodes;
receiving, from the at least one node, a plurality of node identifiers;
authorizing the at least one node based on a comparison of the plurality of node identifiers and identifier data stored in a memory of the configurable software-defined hub;
securely pairing the configurable software-defined hub with at least one authorized node;
configuring a software-defined transceiver chain comprising a configurable hub transmitter and an authorized node receiver with a modified Logical Link Control (LLC) layer and an unmodified Media Access Control (MAC) layer of an Open System Interconnect (OSI) protocol; and
communicating data in a predetermined format from the configurable hub transmitter to the authorized node receiver.

7. The method of claim 6, wherein the configurable hub transmitter is configured to transmit data to the authorized node in a physically contiguous space.

8. The method of claim 6, wherein the predetermined format comprises Inter-IC Sound ($I^2S$).

9. The method of claim 6, further comprising wirelessly receiving data at the configurable software-defined hub from at least one node of the one or more configurable software-defined nodes.

10. The method of claim 6, wherein the plurality of node identifiers comprise two or more of:
a MAC address;
a network ID;
a manufacture ID; or
a product ID.

11. The method of claim 6, wherein the plurality of node identifiers comprises:
a MAC address;
a network ID;
a manufacture ID; and
a product ID.

12. The method of claim 6, wherein configuring the software-defined transceiver chain comprises eliminating or bypassing layers 3-7 of the OSI protocol.

13. The method of claim 6, wherein communicating the data in the predetermined format from the configurable hub transmitter to the authorized node receiver does not require the data to be sent over an internet channel.

14. The method of claim 6, wherein communicating the data in the predetermined format from the configurable hub transmitter to the authorized node receiver comprises communication among known devices using known data format and does not require routing functionality over a wide area network.

15. The method of claim 6, wherein configuring the software-defined transceiver chain further comprises manually or automatically selectively configuring an audio frame buffer size for each destination node to control audio delay or synchronization.

16. The method of claim 15, wherein configuring the audio frame buffer size comprises configuring one or more of a number of samples sent per transmission, a number of bits per audio sample, or an audio data rate.

17. The method of claim 16, wherein the frame buffer size is configured from 500 samples to 5,000 samples, wherein the number of bits per sample is configured to be 16 bits or 24 bits, and the audio data rate is configured to be one of 48 kHz, 96 kHz, or 192 kHz.

18. A non-transitory computer-readable medium including processor-executable instructions, which when executed by a processor, instruct a wireless audio distribution system to perform a method comprising:
receiving, at a configurable software-defined hub, a pairing initiation signal to connect the configurable software-defined hub with at least one node of one or more configurable software-defined nodes;
receiving, from the at least one node, a plurality of node identifiers;
authorizing the at least one node based on a comparison of the plurality of node identifiers and identifier data stored in a memory of the configurable software-defined hub;
securely pairing the configurable software-defined hub with at least one authorized node;
configuring a software-defined transceiver chain comprising a configurable hub transmitter and an authorized node receiver with a modified Logical Link Control (LLC) layer and an unmodified Media Access Control (MAC) layer of an Open System Interconnect (OSI) protocol; and
communicating data in a predetermined format from the configurable hub transmitter to the authorized node receiver.

19. The non-transitory computer-readable medium of claim 18, wherein the processor-executable instructions, which when executed by a processor, further instruct a wireless audio distribution system to wirelessly receive data at the configurable software-defined hub from at least one node of the one or more configurable software-defined nodes, wherein the plurality of node identifiers comprise two or more of:
- a MAC address;
- a network ID;
- a manufacturer ID; or
- a product ID; and wherein configuring the software-defined transceiver chain comprises eliminating or bypassing layers 3-7 of the OSI protocol.

20. The non-transitory computer-readable medium of claim 18, wherein communicating the data in the predetermined format from the configurable hub transmitter to the authorized node receiver comprises communication among known devices using known data format and does not require routing functionality over a wide area network.

\* \* \* \* \*